(12) United States Patent
Backhouse

(10) Patent No.: US 7,638,080 B2
(45) Date of Patent: Dec. 29, 2009

(54) FORMING COMPOSITE STRUCTURES

(75) Inventor: Robert Charles Backhouse, Surrey (GB)

(73) Assignee: Trysome Limited, Surrey (GB)

( * ) Notice: Subject to any disclaimer, the term of this patent is extended or adjusted under 35 U.S.C. 154(b) by 157 days.

(21) Appl. No.: 10/428,928

(22) Filed: May 5, 2003

(65) Prior Publication Data
US 2004/0224139 A1    Nov. 11, 2004

(51) Int. Cl.
*B29C 45/02* (2006.01)
*B29C 45/03* (2006.01)
*B32B 27/04* (2006.01)

(52) U.S. Cl. .................. 264/257; 264/314; 442/164

(58) Field of Classification Search ............. 442/370, 442/164, 168, 171; 264/478, 487, 496, 41, 264/45.1, 645, 45.3, 503, 519, 534, 101, 264/DIG. 58, 314, 257; 428/35.6, 283
See application file for complete search history.

(56) References Cited

U.S. PATENT DOCUMENTS

| | | | | |
|---|---|---|---|---|
| 2,188,091 A | * | 1/1940 | Baermann, Jr. ............. | 335/302 |
| 3,124,626 A | * | 3/1964 | Graham et al. ............. | 264/45.4 |
| 3,286,004 A | * | 11/1966 | Hill et al. ................... | 264/46.6 |
| 3,640,787 A | * | 2/1972 | Heller ......................... | 156/77 |
| 3,985,588 A | * | 10/1976 | Lyman ........................ | 148/103 |
| 4,167,430 A | * | 9/1979 | Arachi ........................ | 156/212 |
| 4,595,623 A | * | 6/1986 | Du Pont et al. .......... | 428/195.1 |
| 4,828,639 A | * | 5/1989 | Aker et al. .................. | 156/245 |
| 5,032,096 A | * | 7/1991 | Scott et al. .................. | 441/74 |
| 5,173,227 A | * | 12/1992 | Ewen et al. ................. | 264/46.6 |
| 5,252,270 A | * | 10/1993 | Haardt et al. .............. | 264/45.4 |
| 5,683,772 A | * | 11/1997 | Andersen et al. ........... | 428/36.4 |
| 5,718,954 A | * | 2/1998 | Sano et al. .................. | 428/35.6 |
| 6,133,172 A | * | 10/2000 | Sevenish et al. ............ | 442/370 |

FOREIGN PATENT DOCUMENTS

| | | | |
|---|---|---|---|
| JP | 3288629 A | 12/1991 | |
| JP | 4282231 A | 10/1992 | |
| JP | 4310726 A | 11/1992 | |

* cited by examiner

*Primary Examiner*—Matthew J. Daniels
(74) *Attorney, Agent, or Firm*—Sughrue Mion, PLLC

(57) ABSTRACT

A method is described for forming a composite article by placing a sheet of a pliable material in a mould, injecting particles into the mould so as to force the sheet of pliable material against the interior wall of the mould, and reinforcing the pliable material.

13 Claims, 2 Drawing Sheets

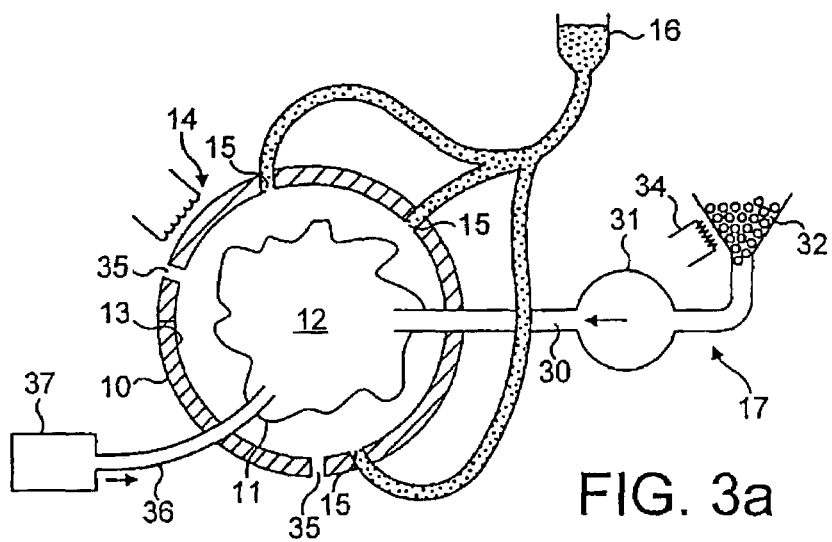
FIG. 3a
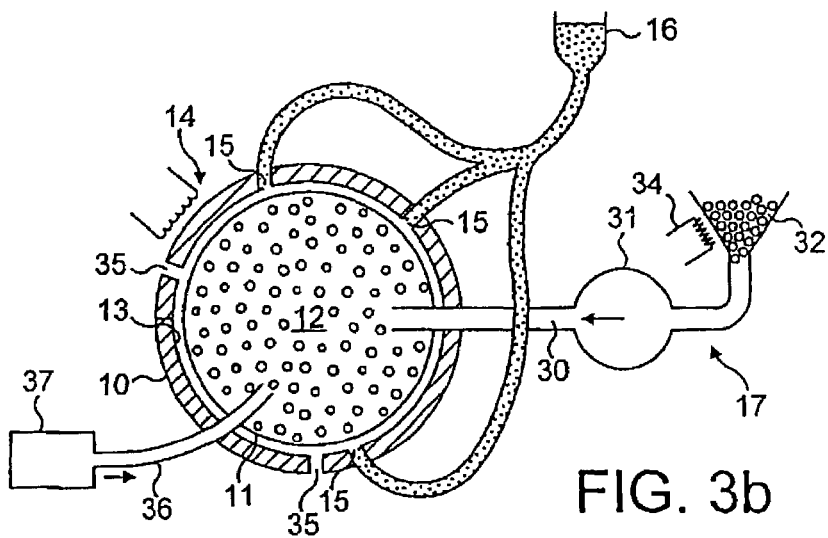
FIG. 3b
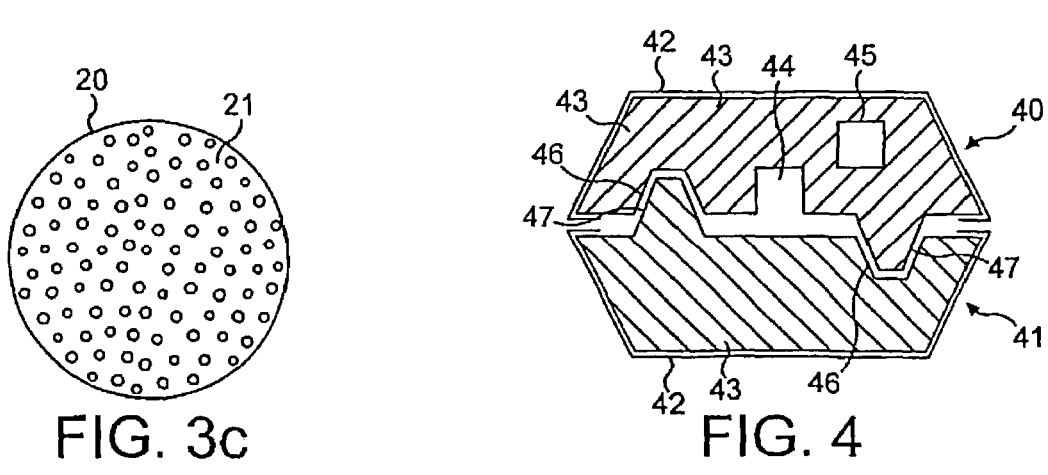
FIG. 3c
FIG. 4

FORMING COMPOSITE STRUCTURES

This invention relates to a method for forming composite structures.

Composite materials such as resin-reinforced carbon fibre offer advantages in the fabrication of structural elements such as beams. One preferred form for such beams is a box structure, with the composite material at or near the beam's exterior. This form is typically stronger than beams that use the same amount of composite material, but at the beam's centre.

Resin reinforced carbon fibre composites are typically formed by impregnating carbon fibres with resin and then curing the resin to form a rigid structure. The carbon fibres are typically in the form of a pliable fabric. In order to ensure that the finished structure has the desired shape, with the fibres in the desired configuration, the fabric must be held in place relative to a mould. Then the resin is introduced into the mould to impregnate the fibres and then cure. Reinforced composites using other materials systems can be formed by an analogous route.

Forming flat panels in this way is relatively straightforward. The fabric can be placed in a mould and the resin poured over it and then cured. Alternatively, the carbon fibre can be pre-impregnated with resin, to form a pre-preg; and the pre-preg can be placed in the mould and cured. However, forming box structures is difficult since in order to arrange that the fabric is at the exterior of the finished component it must be held against the interior of a hollow mould.

FIG. 1 shows one method for forming box structures. A composite precursor, for example a carbon fibre fabric 1 is arranged carefully around the interior of a mould 2, with an inflatable bag 3 located within the precursor. Then the bag 3 is inflated so as to squeeze the precursor against the interior of the mould. At that stage resin can be introduced if necessary, and the resin cured to form a rigid structure. Finally, the bag is deflated and removed from the interior of the cured structure, and the structure is removed from the mould. The finished structure is hollow and its exterior adopts the interior shape of the mould. This process has the disadvantage that because of the precursor's pliability it is very awkward to arrange the precursor and the bag so that the precursor will be properly pressed against the mould. Arranging the precursor and the bag must be done by hand, making this process unsuitable for mass manufacturing.

In an alternative process the composite precursor is wrapped around a block of elastically compressible material, normally of foam rubber, of a slightly larger size than the interior of the mould. Then the precursor and the foam block are loaded into a split mould, and the mould is closed with the precursor wrapped around the block inside it. In closing the mould the block is compressed somewhat, so the precursor is held by the block against the interior of the mould. Then, if necessary, resin is introduced; and the resin cured to form a rigid structure. After curing, the foam block can be removed to leave a the reinforced composite as a rigid hollow element. This method has the disadvantage that it is very awkward to arrange the precursor around the foam. Also, because the foam is slightly larger than the mould space and pushes the precursor outward it is difficult to close the mould without trapping the precursor between the mould halves.

Further problems arise if the element that is to be formed is of a complex shape. First, because of the unitary nature of the bag and the foam block it is difficult to make them force the precursor accurately against a detailed mould. Second, it is difficult to arrange the bag or the foam to allow a branching structure to be formed. For instance, FIG. 2 illustrates a roll cage for a car. The roll cage is formed by a network of mutually intersecting beams, which could usefully be formed as a unitary box section composite article. Because of the interior spaces within the network a complex mould must be used if it is to be fitted around a bag or a foam block. And arranging for the bag or the foam block to squeeze the precursor adequately against the interior of the mould at the intersections between the beams is very difficult.

Similar difficulties apply to the formation of other pliable materials into wall structures.

There is therefore a need for an improved means of forming such structures.

According to one aspect of the present invention there is provided a method for forming a composite article, comprising: placing a sheet of a pliable material in a mould; injecting particles into the mould to as to force the sheet of pliable material against the interior wall of the mould; and reinforcing the pliable material.

According to a second aspect of the present invention there is provided a composite article comprising an outer layer of a reinforced fibre material and an inner core including a zone of compressed particles.

Suitably the pliable material is a fibrous cloth, for example a cloth knitted an or woven from fibres. The fibres are suitably high-strength fibres such as carbon fibre, Kevlar or glass fibre.

The step of reinforcing the pliable material suitably comprises applying a resin to the pliable material and curing the resin. The resin is preferably a heat curable resin, most preferably an epoxy resin.

Preferably the resin is applied after the step of injecting particles. Alternatively, it could be applied before that step.

The step of curing the resin preferably comprises heating the resin, most preferably to accelerate cross-linking of the resin.

The particles are sufficiently large to be inhibited from penetrating the sheet of pliable material. The diameter of the particles is suitably in the range from 1 to 7 mm, preferably in the range from 2 to 3 mm. The particles may generally take the form of beads. The particles may be generally spherical.

The particles are preferably particles of foam, most preferably a dry foam and/or a closed cell foam.

Preferably the mould is an enclosed and/or hollow mould.

The particles may be compressible, preferably elastically compressible. In that case, the method suitably comprises the step of raising the pressure in the mould so as to compress the particles in the mould space/void and then lowering the pressure. The method may comprise the steps of: inhibiting the escape of gas from the mould whilst injecting the particles so that the pressure within the mould void tends to expand on injection of the particles, whereby the particles are compressed, and after injecting the particles allowing the pressure in the mould to fall whereby the particles may expand.

The method may comprise the step after injecting the particles into the mould of heating the particles so as to cause the particles to bond together.

Preferably the particles are heated by introducing superheated steam into the mould.

The step of heating the particles is preferably performed before the step of reinforcing the pliable material.

The method may comprise the step prior to the said placing step of setting the pliable material in a semi-rigid state in which it generally conforms to the interior of the mould.

The present invention will be described by way of example, with reference to the accompanying drawings, in which:

FIG. 3a is a schematic cross-section of a composite article precursor in a moulding apparatus;

FIG. 3b is a cross-section of the composite article a semi-finished state in the moulding apparatus;

FIG. 3c is a cross-section of the composite article in a finished state removed from the moulding apparatus; and FIG. 4 is a cross-section of interlocking composite articles.

Figure 1:
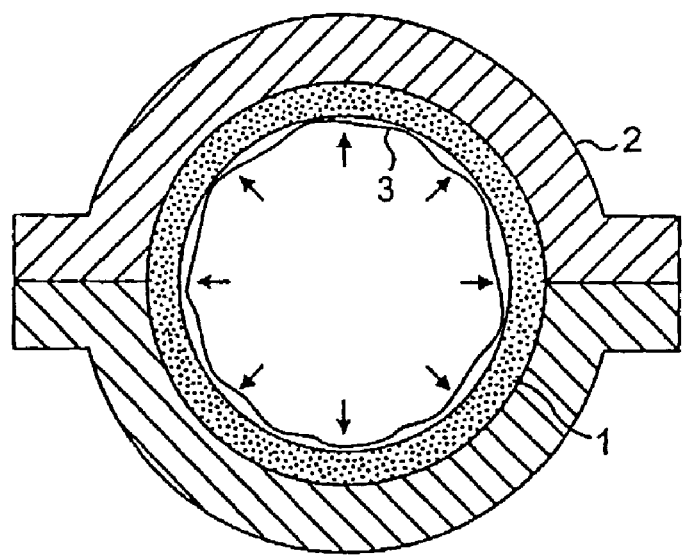
FIG. 1 illustrates a method for forming a composite article.
Figure 2:
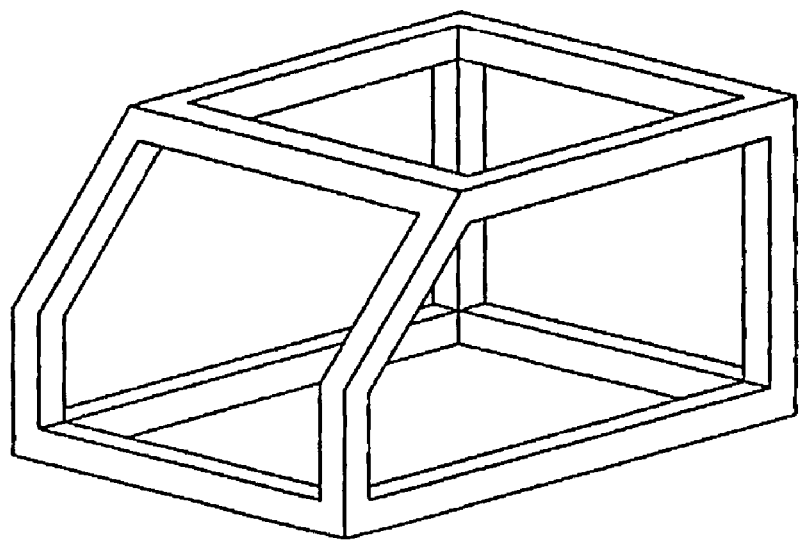
FIG. 2 shows a vehicle roll cage.

FIGS. 3a and 3b show cross-sections of a precursor of a composite article in a mould 10. The precursor includes a knitted or woven carbon fibre cloth 11 which is in a loose hollow form—generally tubular in this example—enclosing an interior space 12. There is sufficient cloth that it is capable of contacting the entire interior wall 13 of the mould. The cloth is of a relatively fine mesh, so particles larger than the apertures in the mesh cannot pass through the cloth.

The mould has a particle injection device (shown generally at 17) which is capable of injecting particles Into the mould void. The outlet for particles into the mould is directed to the interior space 12 enclosed within the cloth. The mould also has a plurality of resin inlets 15 connected to a source of resin 16, and a heater 14 for heating the mould. The resin inlets have valves (not shown) by which the inlets are dosed except when resin is being injected.

To form the composite article, particles larger than the apertures in the mesh of the cloth 11 are pumped into the interior space 12 by the particle injection device 17. This forces the cloth outwards against the interior wall 13 of the mould (see FIG. 3b). Then resin is injected through the Inlets 15 so as to permeate the cloth 11. Once the cloth has been fully permeated, the mould is heated by heater 13 to cause the resin to cure. Once the resin has cured, the finished article can be removed from the mould. The finished article is illustrated in FIG. 3c. It has an exterior layer 20 of resin-reinforced carbon fibre and an interior core 21 of particles.

The interior core can give significant improvements in the mechanical properties of the finished article in comparison to a like hollow article as formed by the process illustrated in FIG. 1. For example, the interior core can toughen the article and enhance vibration damping and energy absorption.

Preferably the particles are beads of dry foam material since these provide a relatively light-weight core for the finished article. Most preferably the foam is a closed cell foam. A suitable choice is beads of expanded polystyrene (EPS), expanded polyethylene (EPE) or most preferably expanded polyethylene (EPP).

EPP is particularly favoured because it can provide good damping and energy absorption. This is especially useful to provide crash strength if the article is to be used as an automotive part. EPP has also been found to have a favourable melting point and density.

The diameter of the particles is suitably in the range from 1 to 7 mm, preferably from 2 to 3 mm. The particles are preferably dry, to avoid interference with the resin. If the particles are of foam may be preferred that the foam does not contain a blowing agent, since a blowing agent may increase the flammability of the final article. This is especially important for automotive applications.

The particles are injected Into the mould through injection tube 30 which is located so as to be directed into the interior space 12 in the cloth 11. The particles are forced down the tube 30 from hopper 32 by pump 31. Additional Injection tubes can be used to help give an even distribution of particles. The particles may be heated by heater 34 immediately before injection, but in most situations the heater 34 can be omitted and the particles injected at ambient temperature. The temperature and pressure at which the particles are injected determines the final density of the core and the degree to which the core consolidates the fabric 11 against the interior surface 13 of the mould 10. Suitable injection pressures are in the range from 2.5 to 4 bar, and suitable pressures in the interior of the mould during curing are around 2 to 3 bar. If the particles are compressible (as, for instance, EPP foam beads are) pressurisation of the particles during filling compresses the beads allowing higher densities of core 21 to be achieved in the final article. It has been found that for EPP beads, a density of 60 g/l in the finished core 21 yields good results.

If desired, additional particles could be injected after the resin has been cured. Then the pressure to which the particles are injected before curing can be used to set the degree of compaction of the cloth/resin 20 and the secondary injection can be used to set the density of the core 21.

Vents such as vent 35 can be provided to allow air trapped inside the mould to escape. The vents are too fine to allow the particles to escape and/or have their inlets located outside the cloth 11.

Instead of providing a core to the finished article, if after the resin has cured the particles 21 are loose then they could be emptied from the cloth/resin 20 to leave a hollow article. Alternatively, it may be desired to make the particles 21 bond together in the core to increase the toughness of the finished article. If the particles can easily be melted, (as, for instance, EPP foam beads can) then this can be done by blowing superheated steam into the core in order to fuse the particles together. In the system of FIG. 3a, this can be done by pumping superheated steam from steam source 36 into the mould via steam inlet tube 36. In one preferred version of the process the particles are fused together in this way after having been injected into the mould and after having forced the cloth 11 against the interior of the mould, but before the resin is injected. Then the fact that the particles are fused together when the resin is injected helps to avoid the resin seeping into the core. If steam is used to fuse the particles together then there Is preferably a subsequent step of blowing dry gas through the mould, or heating the mould with the vents 35 open, so as to drive any residual moisture out of the mould space. This Is preferably done before the resin is introduced.

To help inject the particles into the mould, the injection tubes 30 may be equipped with filler guns for supplementing the pressure from the pump 31. The filler guns could boost the applied pressure at the point of injection to 5 to 8 bar, which may help to achieve more uniform densification of the particulate core. Suitable filler guns are available from Erlenbach Maschinen GmbH. It has been found that using filler guns of this type a typical mould can be filled successfully in around 10 seconds.

Preferably, the particle inlets to the mould space are locked before the resin is injected, so as to hold the particulate core steady during injection of the resin. If filler guns are used, they may be equipped with suitable locks.

The vents 35 could be fitted with pressure relief valves to help control and maintain the pressure inside the mould. In a preferred version of the process, compressible particles are used, and are injected with the vents 35 closed. As the particles are injected the pressure inside the mould space increases, compressing the particles. When the desired amount of particles has been injected the injection tubes 30 are closed. Then the vents 35 are opened. The pressure drops inside the mould and the particles expand, pressing the cloth 11 fully against the interior of the mould. Then the resin is injected and cured. In this process, because the particles are temporarily in a compressed state, with reduced size, improved packing of the core 21 can be achieved.

To increase the likelihood that the carbon fibre cloth adopts the correct configuration when it is pressed against the mould, it can be pre-formed using a binder such as starch to a semi-rigid shape that generally matches the interior of the mould.

In its semi-rigid state the cloth is suitably self-supporting. Instead of a resin transfer process, as described above, the cloth 11 could be pre-impregnated or semi-impregnated with resin. If a pre-preg cloth is used then during the injection of the particles the mould could be heated to a temperature at which the viscosity of the resin is reduced, but at which curing of the resin is still slow. This could help the cloth to conform fully to the inner surface of the mould.

The resin is suitably epoxy resin. Suitable injection pressures for the resin are in the range from 1 to 2 bar. This tends to avoid over compression of the particle core. However, higher pressures could be used to give additional toughness in the outer layer 20 of the final article.

The cloth 11 need not fully enclose the space 12. Especially when pre-formed cloth is used the cloth could only partially surround the space, and the particles could still be used to press the cloth against the interior of a part of the mould. FIG. 4 shows an example of a pair of articles 40, 41 formed in this way, and partially interengaged to form a multi-article component. The articles have resin-reinforced carbon fibre layers 42 around the majority but not the whole of their exterior, and cores 43 of fused EPP beads. The carbon fibre layers 42 constitute the entire outside of the multi-article component, and the layers 42 at the exterior of the individual articles wrap around into the join between the articles. The cores are shaped by the moulds that were used to form the articles into mutually interlocking configurations. Each of the articles 40, 41 has protrusions 46 and/or depressions 47 at its interior side. These allow the articles to be located together and provide mechanical attachment between the articles when they are fitted together to form the component.

Articles formed as described above could include functional spaces in the particulate core. These could be used during the moulding process, for instance to allow resin to be injected from the interior of the article. Alternatively they could have a function in the final article, for instance as channels for wiring looms and the like. The latter arrangement is especially convenient when applied to multi-component articles of the type shown in FIG. 4 since an enclosed channel 44 could conveniently be formed at the join between the individual articles. Alternatively an enclosed channel 45 could be formed within an individual article.

A unitary piece of reinforcing fibre cloth could encircle the particles at the core of the article, or a number of pieces of cloth could be arranged around the core. In the latter case it is preferred that the joints between the pieces of cloth overlap. If it is desired that the cloth does not completely envelope the core then the cloth could only partially enclose the core, as in the articles of FIG. 4.

The principles described above are not limited to use for resin-reinforced carbon fibre. Instead of carbon fibre other fibres, preferably high-strength fibres such as glass fibre or Kevlar, could be used. Other materials could also be used for the matrix. There may be a flow medium to improve flow of the resin into and/or around the fibres. The fibres could be knitted or woven into a cloth.

The present Invention may include any feature or combination of features disclosed herein either Implicitly or explicitly or any generalisation thereof, irrespective of whether it relates to the presently claimed invention. In view of the foregoing description it will be evident to a person skilled in the art that various modifications may be made within the scope of the invention.

The invention claimed is:

1. A method for forming a composite article, comprising:
   placing a sheet of a pliable material in a mould, the mould having an interior wall and defining an enclosed mould void, and at least a portion of the sheet being spaced away from the interior wall of the mould;
   injecting elastically compressible particles into the mould so as to cause the sheet of pliable material to move at least in part, whereby said portion of the sheet being spaced away from the interior wall of the mould is forced outwards against the interior wall of the mould so as to conform to the shape of the interior wall of the mould;
   inhibiting the escape of gas from the mould while injecting the particles so that the pressure within the mould void tends to increase on injection of the particles, whereby the particles are compressed;
   after injecting the particles, allowing the pressure in the mould to fall whereby the particles may expand;
   reinforcing the pliable material; and
   emptying the particles from the mould.

2. A method as claimed in claim 1, wherein the pliable material is a fibrous cloth.

3. A method as claimed in claim 1 or claim 2, wherein the step of reinforcing the pliable material comprises applying a resin to the pliable material and curing the resin.

4. A method as claimed in claim 3, wherein the step of curing the resin comprises heating the resin.

5. A method as claimed in claim 3, wherein the resin is applied after the step of injecting particles.

6. A method as claimed in claim 5, wherein the step of curing the resin comprises heating the resin.

7. A method as claimed in claim 1, wherein the particles are sufficiently large to be inhibited from penetrating the sheet of pliable material.

8. A method as claimed in claim 7, wherein the diameter of the particles is in the range from 1 to 7mm.

9. A method as claimed in claim 1, wherein the particles are particles of foam.

10. A method as claimed in claim 9, wherein the foam is a dry foam.

11. A method as claimed in claim 9 or 10, wherein the foam is a closed cell foam.

12. A method for forming a composite article, comprising:
    placing a sheet of a pliable material in a mould, the mould defining an enclosed mould void;
    injecting elastically compressible particles into the mould so as to cause the sheet of pliable material to move at least in part, so as to conform to the shape of the interior wall of the mould;
    inhibiting the escape of gas from the mould while injecting the particles so that the pressure within the mould void tends to increase on injection of the particles, whereby the particles are compressed;
    after injecting the particles, allowing the pressure in the mould to fall whereby the particles may expand;
    reinforcing the pliable material; and
    emptying the particles from the mould.

13. A method as claimed in claim 12, comprising prior to said placing step, setting the pliable material in a semi-rigid state in which it generally conforms to the interior of the mould.

* * * * *